May 19, 1931.  R. J. McLEOD  1,806,359
THREAD MILLING MACHINE
Filed Oct. 2, 1928
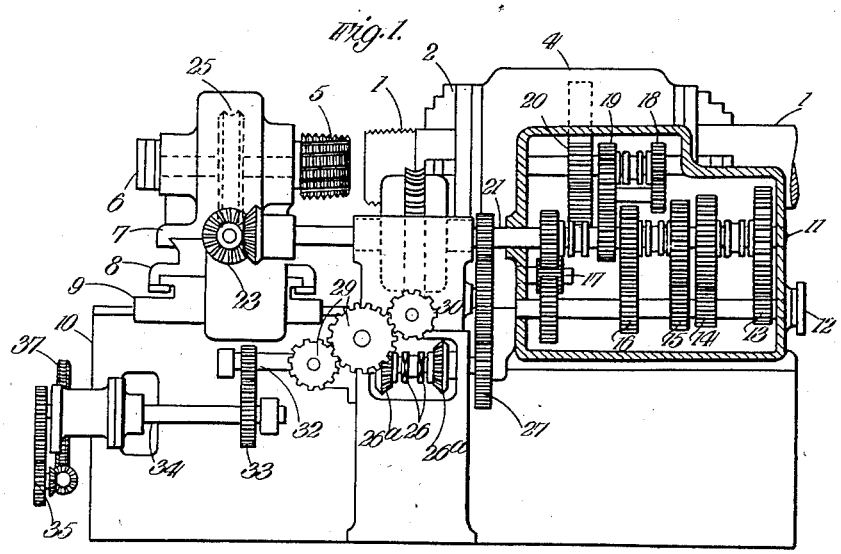
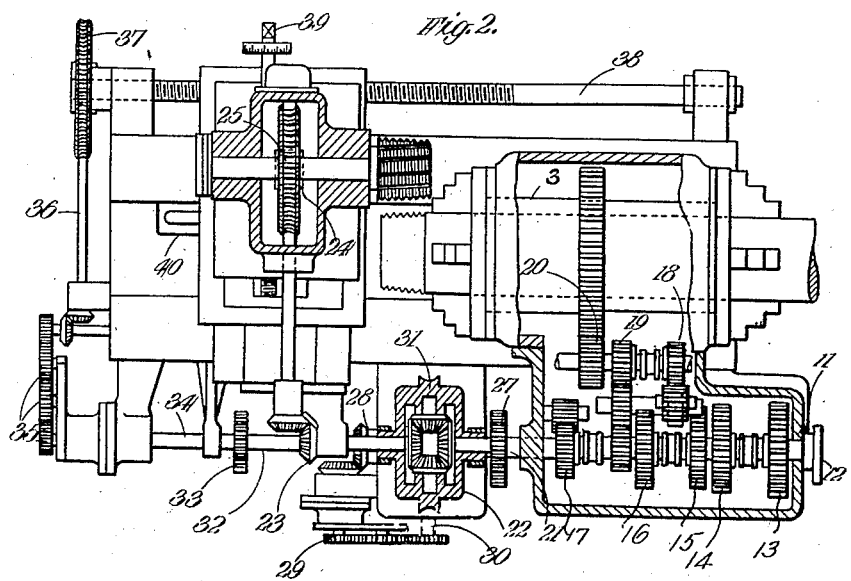
Inventor
Robert J. McLeod
By
Attorney Patented May 19, 1931

1,806,359

UNITED STATES PATENT OFFICE

ROBERT JAMES McLEOD, OF WEST DRAYTON, ENGLAND

THREAD MILLING MACHINE

Application filed October 2, 1928, Serial No. 309,777, and in Great Britain July 18, 1928.

The invention relates to machines for milling screw threads, more particularly to machines using cutters of the hob type having teeth following the line of a screw thread of the same pitch as that of the thread to be cut.

In producing screw threads with this type of hob, which revolves at the same number of revolutions as the work, or at a greater number of revolutions depending upon the number of threads on the hob, but does not travel longitudinally, it is found that minute facets or periodic ridgings are formed on the work.

According to the present invention, means are provided for varying the relative speeds of rotation of the hob and of the work and for simultaneously imparting a required longitudinal traverse to the hob relatively to the work, so that the number of facets is multiplied by a known amount, or in other words, their periodicity is designedly increased, whilst their dimensions are decreased so that they cease to be discernible and in practice are negligible.

If, for instance, there are thirty teeth or cutting edges in the circumference of the hob, then, if the hob revolves at the same speed as the work, thirty facets or cusps will be produced, joined to each other by well defined ridges, since each cutting edge will always engage with the same position on the work.

If, however, the relative speed of the hob is very slightly increased so that in, for example, 200 revolutions of the work the hob makes 201 revolutions, each cutting edge of the hob will have taken up 201 different positions on the work, whilst the hob will have traversed longitudinally the space of one pitch of the screw, thereby increasing the number of facets from thirty to $$30 \times 201 = 6030.$$

If, for example, a piece of work to be screwed is 10 inches in diameter, that is, 31.416 inches in circumference and for each 300 revolutions of the work the hob makes 301 revolutions, instead of thirty facets each measuring 1.047 inches from ridge to ridge, 9030 facets are obtained each measuring 0.00347 inches from ridge to ridge. If the hob gains one revolution in a still greater number of revolutions, a stage is reached when the number of facets is so great that they become infinitesimal. For all practical purposes an advance of one revolution in 200 is sufficient, the hob traversing longitudinally one pitch of the screw.

To carry out the process described above a differential gear and differential change speed gear, both of known type, are introduced between the hob and the work and also change speed gear between the differential gear and a lead screw for controlling the rate and amount of longitudinal traverse. This gearing is of high ratio so as to give the relatively minute movements required, since the whole process is one of relatively minute movements both of the differential in increasing the speed of revolution of the hob and in the longitudinal traverse.

In the preferred method of working the differential gearing by which the slight excess of speed can be imparted to the hob is not used during the process of cutting the work to the required depth, but only during the finishing cut in which the facets are increased in number until their effect is negligible.

A reverse gear is provided by which all the movements of the machine are reversed and the hob and work can be brought back to their original starting position and a further cut taken if necessary, in order to reduce to gauge dimensions, after which suitable stops can be used for the reproduction of similar screwed parts. In order to increase the rate of production a change speed gear is provided by which a high speed of rotation is used when multiplying the facets after the depth of thread has been cut.

By this apparatus threads can also be cut with "ring hobs" (in which the teeth are at right angles to the axis of the hob) or with single milling cutters, as used in milling worms.

Threads of any known type, whether right or left handed, internal or external, can be cut by the method according to the invention.

In the accompanying drawings which represents an example of a thread milling machine according to the invention, Fig. 1 is a front elevation and Fig. 2 a plan.

1 is the work to be threaded secured to a chuck 2 mounted on a spindle 3 in a housing 4. The hob 5, which is shown as tapered and of the true screw type, is secured to a spindle 6 mounted in the saddle 7 sliding on the cross slide 8 and the longitudinal slide 9 on the bed 10. The spindle 3 is driven in the example illustrated by the change speed gears shown in gear box 11 arranged for direct motor driving through a coupling 12. This gear box provides four speeds for a spindle 21 through trains of gears 13, 14, 15 and 16, reverse gear 17 and a reverse gear 18 for the the spindle 3; all the gears are operated by suitable clutches. The spindle 3 is driven from the spindle 21 through gear trains 19 and 20 for one direction of rotation, and in the opposite direction by gear trains 18 and 20. The shaft 21 drives the hob 5 through differential gear 22, bevel gears 23, worm 24, worm wheel 25, the worm wheel being keyed to the hob spindle 6.

When cutting a screw thread to depth, in which an equal and relatively slow speed is imparted to the tool and work, and an equal and relatively greater speed on the return motion, the differential gear 22 runs idle, the next operation being to multiply the facets generated by the previous operation; for this purpose the differential gear 22 is brought into operation in the required direction of rotation by clutches 26 and bevel gear 26ª (Fig. 1). The gear 26ª obtains its motion from the spindle 21 through a train of gears 27, and is connected through bevel gears 28 (Fig. 2) and change gears 29 to a spindle 30 which drives the worm wheel 31 of the differential gear, so as to give the desired increase of speed to the hob 5 of one revolution in a comparatively large number of revolutions. If the hob makes one revolution more than the work, both being of the same pitch, the hob must traverse longitudinally through the space of one pitch. This motion is obtained from the clutch 26, and in order that its direction should correspond to that of the spindle 32 of the reversible clutch 26 the spindle 32 is prolonged and drives a gear train 33, spindle 34, change gears 35, worm shaft 36, worm and worm wheel 37 and lead screw 38, which imparts the desired traverse to saddle 9. The usual saddle screw for feeding the hob into depth is shown at 39 and 40 is a former plate for use when screwing taper threads.

The reverse gear 17 enables the rotation of the whole machine to be reversed in order to take a fresh cut with the hob, while maintaining the exact relative positions of the threads of the hob and the work when the depth of cut is determined in known manner by adjustable stops for the purpose of obtaining the exact settings to gauge. The reverse gear 18 will be used when screwing internal threads since with this system a left hand screwed hob produces a right hand internal screw.

The change speed gear 13—16 enables the return movement of the hob 5 to be carried out at a higher speed than the cutting movement. Also, the finishing cut by which the facets are multipled so as to be unobservable and negligible is also effected at a high speed.

Having thus described the nature of the said invention and the best means I know of carrying the same into practical effect, I claim:—

1. In a machine for milling screw threads by hobs of the same pitch as the work in which after the thread has been cut to depth a finishing cut multiplies the facets, a main driving shaft, change speed gear on said shaft, a spindle carrying the work, a spindle, the axis of which is parallel to said work spindle, carrying said hob, means by which said change speed gear imparts an equal and relatively slow speed to both of said spindles on cutting to depth and an equal and relatively faster speed to said spindles on the return motion and a differential gear interposed between said change speed gear and said hob spindle by which an additional speed of rotation, of not more than one in 200 revolutions, is imparted to the hob spindle relatively to the work spindle in the final cut in multiplying the facets, a lead screw and means by which the additional rotation is imparted to the said lead screw.

2. A machine for milling screw threads according to claim 1, in which means are provided for reversing the direction of rotation of the work spindle relatively to that of the hob spindle, when cutting an internal thread.

3. A machine for milling screw threads according to claim 1, in which the lead screw is operated through gearing which at the same time imparts an increase of speed to the hob spindle through said differential gearing.

4. A machine for milling screw threads according to claim 1, in which the additional rotation imparted to the lead screw is limited to the amount corresponding to the axial distance between two adjacent threads cut on the work.

In testimony whereof I have signed my name to this specification.

ROBERT JAMES McLEOD.